UNITED STATES PATENT OFFICE.

JOHN F. BENNETT, OF PITTSBURG, PENNSYLVANIA.

PURIFYING IRON WITH CARBONIC-ACID GAS.

SPECIFICATION forming part of Letters Patent No. 285,786, dated October 2, 1883.

Application filed November 20, 1880. (No specimens.)

*To all whom it may concern:*

Be it known that I, JOHN FRANCIS BENNETT, a citizen of the United States, residing at Pittsburg, in the county of Allegheny and State of Pennsylvania, have invented certain new and useful Improvements in Purifying Iron with Carbonic-Acid Gas; and I do hereby declare that the following is a full, clear, and exact description of the invention, which will enable others skilled in the art to which it appertains to make and use the same.

Heretofore pig and cast iron have been purified from excess of carbon in the manufacture of steel by blowing carbonic-acid gas through the metal when in a molten state, or by applying said gas intermixed with atmospheric air or steam to granulated pig or cast iron at a temperature sufficient to insure fluidity; also, crude iron has been relieved of silicon, sulphur, phosphorus, and other impurities which form chemical combinations with the oxygen of the carbonic acid and deposit the carbon, by the use of carbonic-acid gas, either alone or mixed with atmospheric air, when introduced into the molten metal, immediately following the pneumatic process, which consists in the removal of the excess of carbon by subjecting the metal, while in a molten state, to an atmospheric blast, thereby producing combustion of the carbon and the requisite heat without separate fuel.

The object of my invention is the purification of liquid iron from sulphur and phosphorus, after the silicon and excess of carbon have been removed, in an open-hearth furnace; and to this end my invention consists, first, in passing carbonic-acid gas over and through it while in the open-hearth furnace; and, second, to keep such purified iron liquid, without disturbing the relative proportions of its constituent parts, until the impurities held in suspension therein have had time to rise to the surface as slag, which is readily isolated.

The difficulty to be contended with in utilizing the Bessemer converter for purifying iron by carbonic-acid gas is that when the pig-iron acted upon contains a large proportion of sulphur and phosphorus the passage through it of carbonic-acid gas sufficient to eliminate these impurities causes the metal to lose the fluidity essential to its further treatment; and to obviate this I cause the liquid iron, after decarburization in the Bessemer converter, to be poured into a previously-heated open-hearth furnace having tuyeres placed therein so that their nozzles terminate about one inch above the bottom of the liquid metal, and then inject into the metal hot or cold carbonic-acid gas, causing ebullition in the metal, and thus accelerating the operation. An undesirable feature in using the Bessemer converter to decarburize pig-iron is the necessity of employing only that pig-iron which contains silicon, in order to retain fluidity. Besides the fact that this consumption of silicon as a fuel is costly, it is found that the steel is deteriorated by being charged with a portion thereof, which mingles with the iron as silicate of iron. In my process the decarburized iron is poured into an open-hearth furnace, where all the heat requisite for its further treatment is readily imparted without the necessary use of silicon. Any reverberatory furnace capable of sustaining the necessary temperature will suffice for this purpose. I would here name as a modification of this part of my invention that pig-iron, scrap wrought-iron, scrap-steel, and iron ore may be brought into the liquid state in an open-hearth furnace, as now practiced in the Siemens–Martin process, and atmospheric air injected through the tuyeres, arranged as above described, until the bath of liquid iron is decarburized, after which carbonic-acid gas may be blown in. After this I proportion the gases which constitute the hot flame that passes over the liquid bath in the open-hearth furnace so that while they generate sufficient heat to keep the metal fluid they will not oxidize it. I so regulate this flame as to secure, in addition to the nitrogen incidentally present, a mixture of forty to forty-five per cent. of carbonic oxide (CO) and fifty to sixty per cent. of carbonic-acid gas, ($CO_2$). When the gases supplied are at a common temperature, their volumes may be equal. The effect of the gases thus proportioned, when absorbed and occluded in the liquid metal, is that the gases balance one another, and neither permit the oxidation of the ingredients of the metal, nor the deposition of carbon from the gases. By reason of the quiescent state of the liquid metal, the scoria formed during the violent chemical reactions readily overcome the affinity by which they were held mechanically in the metal and rise to the surface. This should constitute the last course in the treatment.

Although I have separated my invention into two branches independent each of the other, it is obvious that they are consecutive steps in my process and dependent on each other to attain the single result.

Having thus fully described my invention, what I claim, and desire to secure by Letters Patent of the United States, is—

In the purification of liquid iron and steel, the process of passing carbonic-acid gas over and through the molten metal in an open-hearth furnace after the metal has been decarburized, whereby the sulphur and phosphorus are eliminated, and finally keeping the metal in a fluid state, without altering the proportions of the constituent elements, by passing over the liquid bath in said furnace equal quantities, at a common temperature, of carbonic-oxide gas and carbonic-acid gas, which so neutralize each other that the slag readily rises to the surface, all substantially as herein set forth.

JOHN FRANCIS BENNETT.

Witnesses:
A. C. JOHNSTON,
FRANK PATTERSON.